United States Patent [19]

Tanaka et al.

[11] Patent Number: 5,355,717
[45] Date of Patent: Oct. 18, 1994

[54] ROAD SURFACE CONDITION SENSOR FOR CONTROLLING BRAKES

[75] Inventors: Keishin Tanaka; Toichiro Hikichi; Chiaki Kumagai, all of Wako, Japan

[73] Assignee: Honda Giken Kogyo Kabushiki Kaisha, Tokyo, Japan

[21] Appl. No.: 80,117

[22] Filed: Jun. 23, 1993

[30] Foreign Application Priority Data

Jun. 25, 1992 [JP] Japan .................. 4-167508

[51] Int. Cl.⁵ .............................. G01B 5/28
[52] U.S. Cl. ...................... 73/105; 73/118.1; 364/426.02 X
[58] Field of Search .......... 73/118.1, 116, 117.3, 73/105; 364/426.02

[56] References Cited

U.S. PATENT DOCUMENTS 5,222,570  6/1993  Kawamura et al. ........ 364/426.02 X

Primary Examiner—Hezron E. Williams
Assistant Examiner—James M. Olsen

[57] ABSTRACT

A road surface condition sensor for judging if there is an appreciable unevenness on a road surface to provide a desirable braking performance for a vehicle, which comprises a vehicle speed estimating circuit for estimating the running speed of the vehicle, a steering angle sensor for detecting a steering angle of the vehicle, and a judging circuit for making a judgement as to whether the magnitude of a time-derivative of the steering angle indicative of the unevenness of a road surface is greater than a threshold value which is determined according to the estimated running speed of the vehicle, and for outputting a road surface condition signal representing results of the judgement.

11 Claims, 9 Drawing Sheets

ROAD SURFACE CONDITION SENSOR FOR CONTROLLING BRAKES

BACKGROUND OF THE INVENTION

1. Field of the Invention

This invention relates to a road surface condition sensor for judging if there is an appreciable unevenness on a road surface to provide desirable performance of brakes for a vehicle.

2. Description of the Related Art

An antilocking system for the brakes for a vehicle, such as a motorcar or a motorcycle, is known when a vehicle is traveling on a road, a braking force working between a braked wheel and the road surface generally increases as a slippage ratio of the wheel increases. Here, the slippage ratio of the wheel is defined as the ratio of the difference between the running speed of the vehicle and the peripheral speed of the wheel vs. the running speed of the vehicle. However, when the slippage ratio attains and exceeds a critical value, the braking force decreases from its maximum. The antilocking control of the brakes makes use of the above-mentioned relationship between the slippage ratio and the braking force to provide an optimum braking performance for the vehicle.

In the relationship between the slippage ratio and the braking force, the critical value of the slippage ratio (a "target slippage ratio") which gives the maximum of the braking force varies depending on the coefficient of friction of the road surface against the wheel. It is therefore important for the antilocking control of brakes to accurately estimate the coefficient of friction of the road surface, while the vehicle is running, to determine a proper target slippage ratio.

No matter what means to find out the coefficient of friction of a road surface is employed, it is necessary to obtain accurate values of the rotation of wheels, the speed and/or acceleration of the vehicle, etc., so as to accurately estimate the coefficient of friction.

However, as every part of a vehicle during operation is always vibrated by unevenness of the road surface, noises due to the vibration tend to mingle with the output of various sensors for detecting quantities necessary to obtain the coefficient of friction, causing efforts to accurately determine the coefficient of friction and to set a proper target slippage ratio to fail.

SUMMARY OF THE INVENTION

The present invention has been made to solve the aforementioned problem. The object of the present invention is, therefore, to provide a road surface condition sensor, which is capable of providing information regarding the unevenness of a road surface, thereby to enable a desirable control of brakes for the vehicle in the presence of noise in sensor output signals caused by the vibration due to the unevenness.

The road surface condition sensor, provided by the present invention for achieving the above object, comprises: vehicle speed estimating means for estimating the running speed of the vehicle; a steering angle sensor for detecting a steering angle of the vehicle; and judging means for making a judgement as to whether the magnitude of a time-derivative of the steering angle is greater than a threshold value which is determined according to the estimated running speed of the vehicle, and for outputting a road surface condition signal indicative of results of the judgement.

The road surface condition sensor of the invention works basically on the fact that the front wheel of the vehicle running on an uneven road surface is kicked by the uneven surface, causing a steering bar or a steering wheel to be severely vibrated. Therefore, it is judged from the magnitude of a differentiation with respect to time, or a time-derivative, of the steering angle, whether there is an appreciable unevenness on the road surface. However, when the vehicle is running at a higher speed, the magnitude of the time-derivative of the steering angle tends to decrease, because of an increased rotational inertia of the wheel which makes the steering bar or wheel more reluctant to the vibration caused by the same unevenness of the road. To compensate the decreasing tendency in the magnitude of the time-derivative of the steering angle at a higher running speed, the judgement on the unevenness of the road is effected by determining whether the time-derivative of the steering angle is greater than a threshold value which decreases in response to the higher running speed.

The vehicle speed estimating means, comprised in the road surface condition sensor of the invention, can estimate the running speed of the vehicle from a peripheral speed of the wheel, based on the rotational speed of the wheel detected by a tachometer attached thereto. The running speed can also be estimated from a time-integral of the acceleration of the vehicle detected by an accelerometer mounted on the vehicle body.

However, the estimation based on the peripheral speed of the wheel may give a poor result when there is detected a magnitude of acceleration or deceleration of the vehicle, because slipping ratio may be increased in such a situation. In the opposite situation, where there is substantially no acceleration detected, the estimation based on the acceleration may give a poor result, because the noise included in the output of the accelerometer becomes not negligible. Therefore, the vehicle speed estimating means may preferably employ a combined method, wherein the two estimating methods described above are interchangeably switched over depending on an absolute magnitude of acceleration.

Results obtained from the road surface condition sensor according to the invention may be applied to brake control systems for vehicles in which a target slippage ratio is determined taking the road surface condition regarding the surface unevenness into account.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Several embodiments of a road surface condition sensor according to the present invention, mounted on a motorcycle shown in FIG. 1, will be described in detail with reference to the accompanying drawings.

Figure 1:
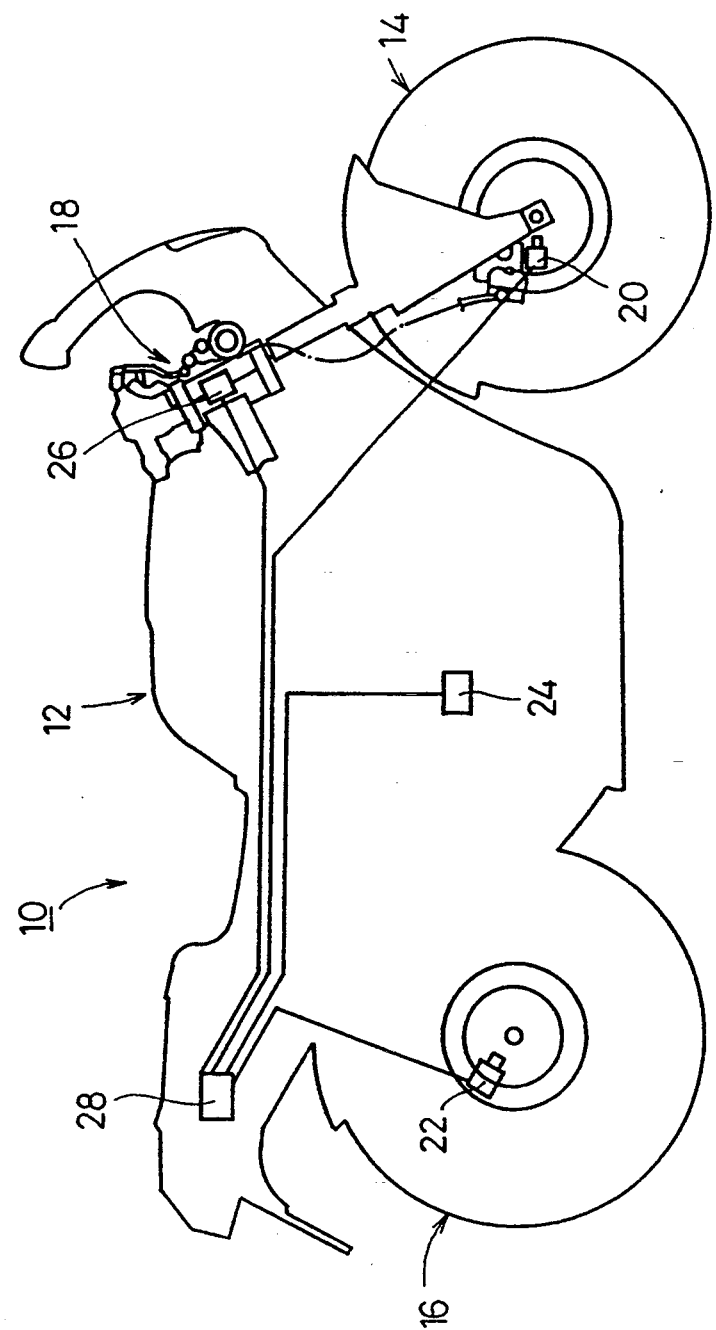
FIG. 1 is a fragmentary side view showing a motorcycle to which the road surface condition sensor according to the present invention is mounted.

In FIG. 1, a motorcycle 10 comprises a main body 12, a front wheel 14, a rear wheel 16 and a steering bar 18. Tachometers 20 and 22, each of which comprises a rotary encoder or the like, are respectively mounted to the front and rear wheels 14 and 16. A steering angle sensor 26 is mounted to the steering bar 18. The sensors 20, 22 and 26 are respectively electrically connected to a control unit 28. Further, a vehicle accelerometer 24 is attached to the main body 12, and electrically connected to the control unit 28 in an embodiment described later. A road surface condition sensor is made up of these components.

Figure 2:
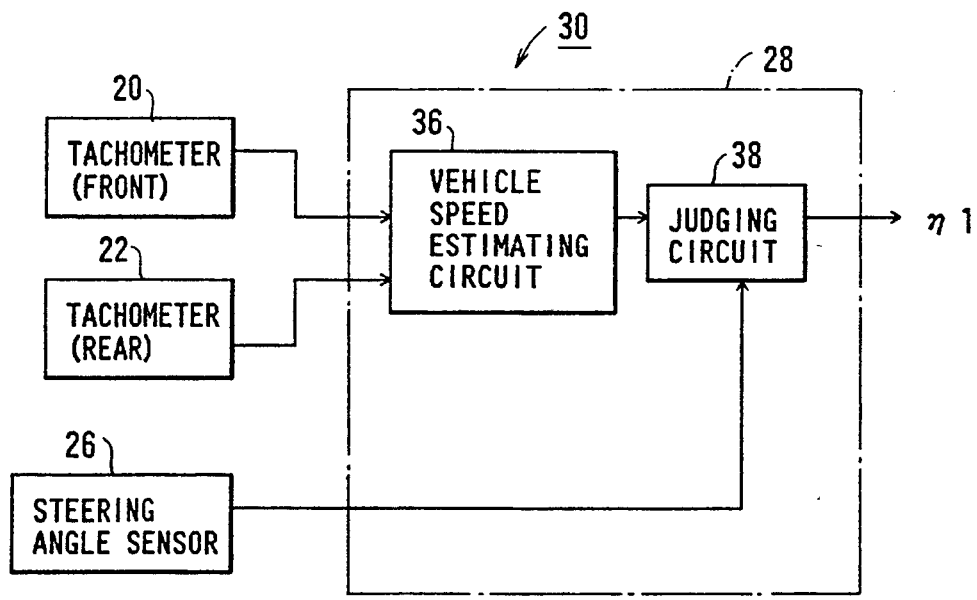
FIG. 2 is a block diagram showing the overall structure of a road surface condition sensor as a first embodiment according to the present invention.

FIG. 2 is a block diagram showing the overall structure of a road surface condition sensor as a first embodiment according to the present invention. In FIG. 2, the control unit 28 comprises a vehicle speed estimating circuit 36 and a judging circuit 38.

In the vehicle speed estimating circuit 36, a pulse train from either of the tachometer 20 or 22 is received, the number of the pulses per unit time is counted, and a constant is multiplied to the pulse count to produce a peripheral speed of the selected wheel, which is taken as the running speed of the vehicle $V_{ref}$.

Figure 3:
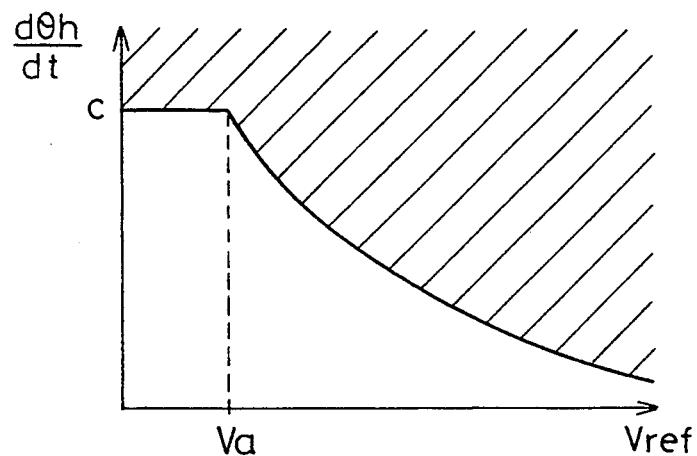
FIG. 3 is a graph for describing judging criteria employed in the road surface condition sensor as the first embodiment.

The judging circuit 38 makes a judgement on the road surface condition based on the running speed of the vehicle $V_{ref}$, an output signal $\theta_h$ from the steering angle sensor 26 and judging criteria shown in FIG. 3. Here, the judging criteria will be explained. Y-axis of the graph represents a differentiation with respect to time, or a time-derivative, of the steering angle, $d\theta_h/dt$, and X-axis represents the running speed of the vehicle. A solid curved line traversing the graph represents a set of threshold values for judging the road surface condition. The threshold values are a constant c in a region where the running speed of the vehicle is lower than a predetermined speed $V_a$, and in a region where the running speed of the vehicle is equal to or greater than $V_a$, the threshold values decrease as the running speed increases, inverse-proportionally from the constant c.

When the magnitude of the time-derivative of the steering angle is greater than the threshold values, the road surface condition is judged as such that there is an appreciable unevenness existing on the road surface, and otherwise, there exists substantially no unevenness. This comparison is repeated a plurality of times in order to determine the cause of variation in the steering angle. If the above condition for an affirmative judgement is met a multiple times successively, the cause is determined to be the unevenness of the road, and otherwise, to be the driver of the vehicle.

The reason why the threshold values decrease as the running speed increases is that there is a decreasing tendency in the magnitude of the time-derivative of the steering angle as the running speed becomes higher because of an increased rotational inertia of the wheel which makes a steering bar or wheel more reluctant to the vibration caused by the unevenness of the road, and that it is necessary to compensate the decreasing tendency in order to make a proper judgement regardless of the running speed of the vehicle. When the running speed of the vehicle is lower than $V_a$, the threshold values are constant, because the rotational inertia of the wheel is neglible in such a region.

Figure 4:
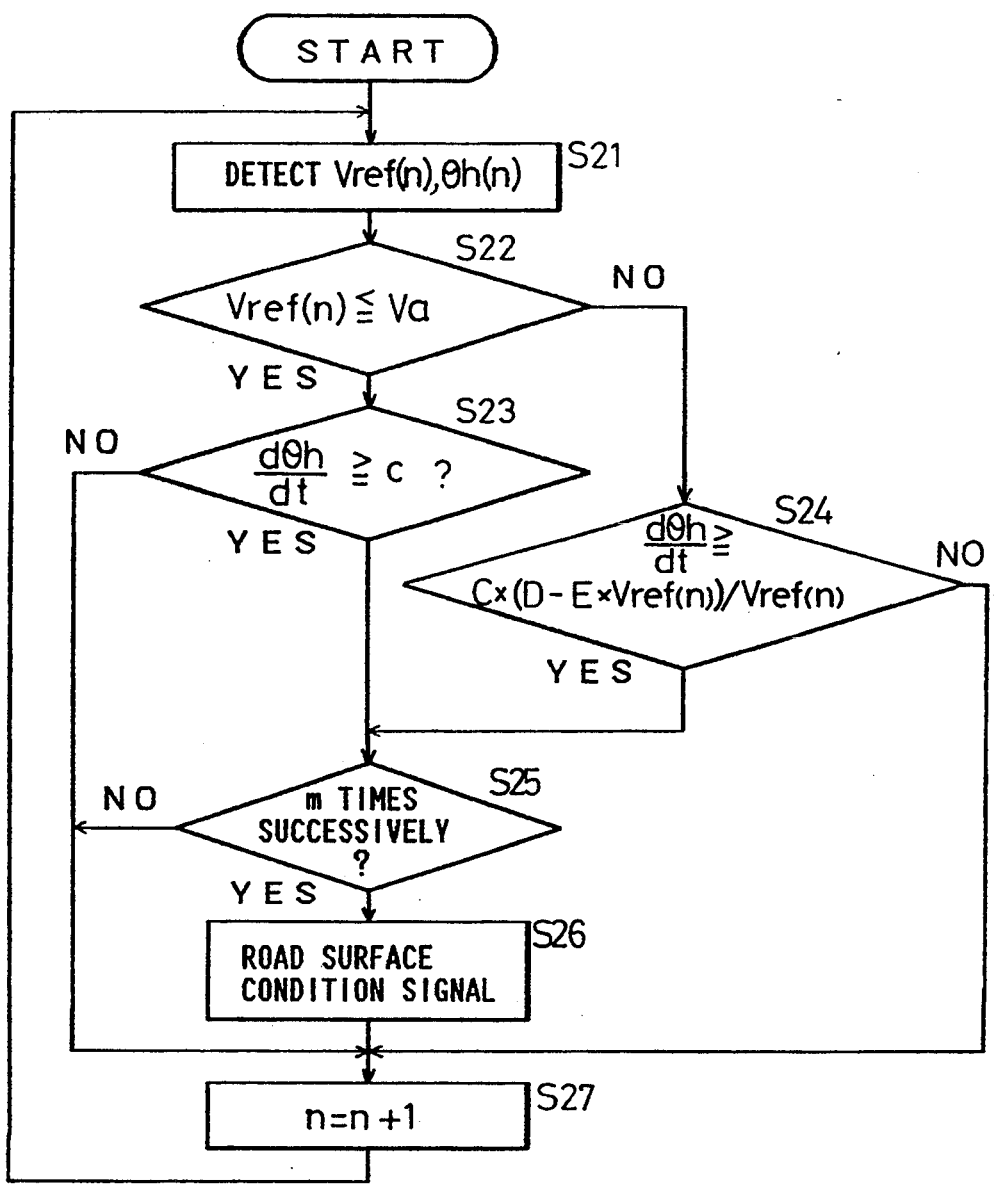
FIG. 4 is a flowchart for describing procedures for judging a road surface condition in the road surface condition sensor as the first embodiment.

Now, detailed procedures of judging the road surface condition in the road surface condition sensor of the present invention will be described with reference to FIG. 4.

The running speed of the vehicle $V_{ref(n)}$ is first estimated in the above-described manner and the steering angle $\theta_{h(n)}$ detected by the steering angle sensor 26 are outputted to the judging circuit 38 (Step S21). Here, suffix n represents an n-th result in the recursive estimation. It is then determined whether the estimated running speed $V_{ref(n)}$ is less than or equal to the predetermined speed $V_a$ (Step S22). If the answer is YES in Step S22, it is then determined whether the magnitude of the time-derivative of the steering angle $\theta_{h(n)}$ is greater than or equal to the predetermined value c (see a flat line in FIG. 3) (Step S23). If the answer is NO in Step S22, it is then determined whether the magnitude of the time-derivative is greater than or equal to $C \cdot (D - E \cdot V_{ref(n)})/V_{ref(n)}$ (see a curved line in FIG. 3) (Step S24). Now, the letters C, D and E respectively represent constants. If the answer is YES in Step S23 or in Step S24 (see a hatched area in FIG. 3), it is then determined whether this condition has been successively met m times (Step S25). If the answer is YES in Step S25, it is determined that the cause of variation in the steering angle is the unevenness of the road surface, and the judging circuit 38 outputs a road surface condition signal $\eta_1 = \beta$ (where $\beta$ is a constant, $0 < \beta < 1$), and otherwise, it is determined that there is substantially no unevenness on the road surface and the road surface condition signal $\eta_1 = 1$ is outputted (Step S26). Thereafter, the above steps are repeated (Step S27).

In the first embodiment, the running speed of the vehicle $V_{ref}$ is estimated from the peripheral speed of either of front or rear wheel. Here, a proper wheel can be selected according to the following scheme, for example. Namely, one wheel having the maximum wheel speed is selected out of a multiple wheels as the selected wheel should have the minimum slippage, and the peripheral speed of the selected wheel can be regarded as an estimated running speed of the vehicle.

Now, a second embodiment of the road surface condition sensor of the present invention will be described.

Figure 5:
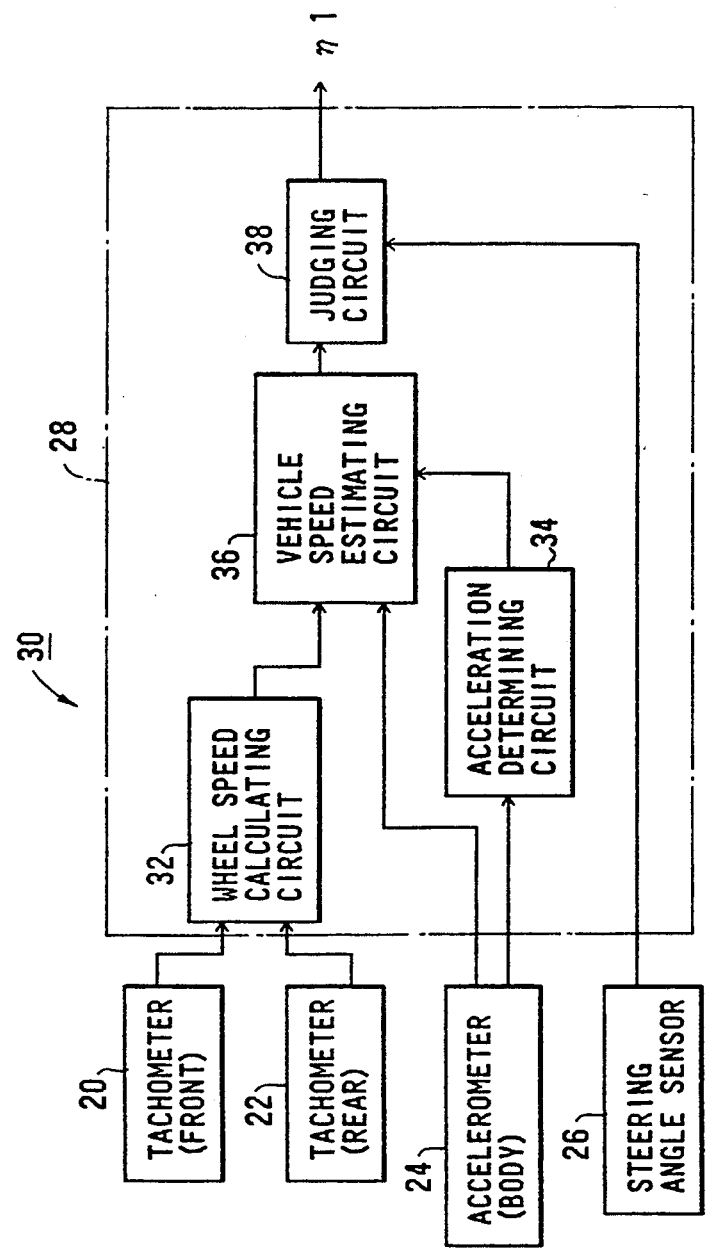
FIG. 5 is a block diagram showing the overall structure of a road surface condition sensor as a second embodiment according to the present invention.

FIG. 5 is a block diagram showing the overall structure of a road surface condition sensor as the second embodiment of the present invention. In the present embodiment, an accelerometer 24 mounted on the vehicle body, a wheel speed calculating circuit 32 and an acceleration determining circuit 34 are further comprised in the control unit 28, in addition to the construction of the first embodiment.

The accelerometer 24 detects an acceleration (if the sign is negative, it means a deceleration) $G_x$ of the main body 12. The wheel speed calculating circuit 32 calculates wheel peripheral speeds $V_{wf}$ and $V_{wr}$ of the front and rear wheels 14 and 16 from signals outputted from the tachometers 20 and 22, respectively. The acceleration determining circuit 34 determines whether the vehicle is being accelerated, based on a signal outputted from the accelerometer 24.

The operation of the vehicle speed estimating circuit 36 in the second embodiment differs from that in the first embodiment. However, the operations performed by the judging circuit 38 is identical to those in the first embodiment, and description thereof is omitted.

The vehicle speed estimating circuit 36 in the second embodiment make use of the acceleration $G_x$ and either of the wheel peripheral speeds $V_{wf}$ or $V_{wr}$, employing an estimating scheme in which a time-integral of the acceleration $G_x$ is taken as the running speed of the vehicle $V_{ref}$ when an absolute value of the acceleration $G_x$ is greater than a predetermined value, and otherwise, either of the wheel peripheral speeds $V_{wf}$ or $V_{wr}$ is taken as the running speed of the vehicle $V_{ref}$.

Detailed procedures performed in the acceleration determining circuit 34 and the vehicle speed estimating circuit 36 will be described with reference to FIGS. 6 to 8.

Figure 6:
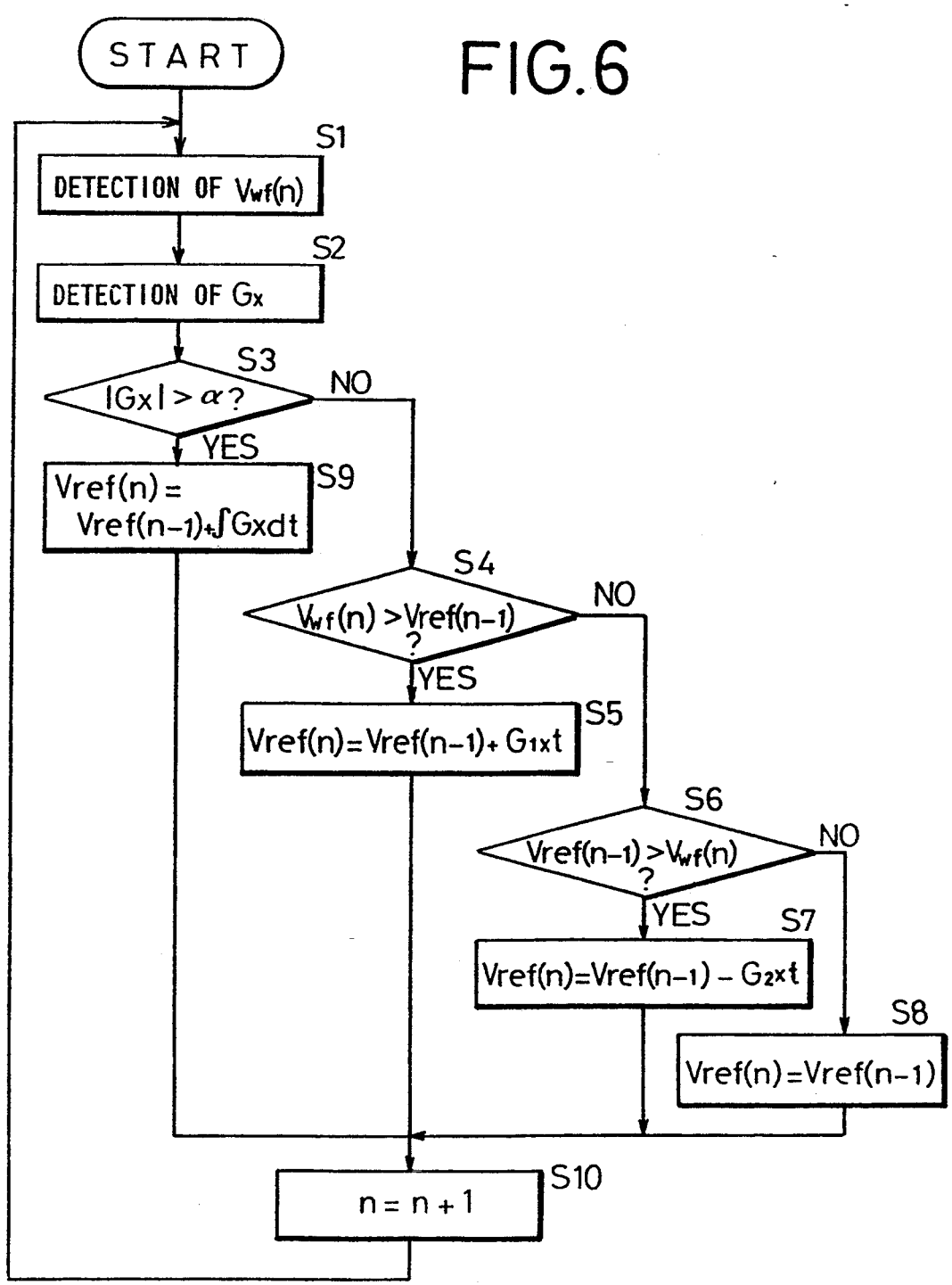
FIG. 6 is a flowchart for describing procedures for estimating a running speed of the vehicle in the road surface condition sensor as the second embodiment.

FIG. 6 is a flowchart for describing the procedures performed in the acceleration determining circuit 34 and the vehicle speed estimating circuit 36. FIG. 7 is a graph for explaining an example in the result of the estimation obtained through the procedures shown in FIG. 6.

Figure 7:
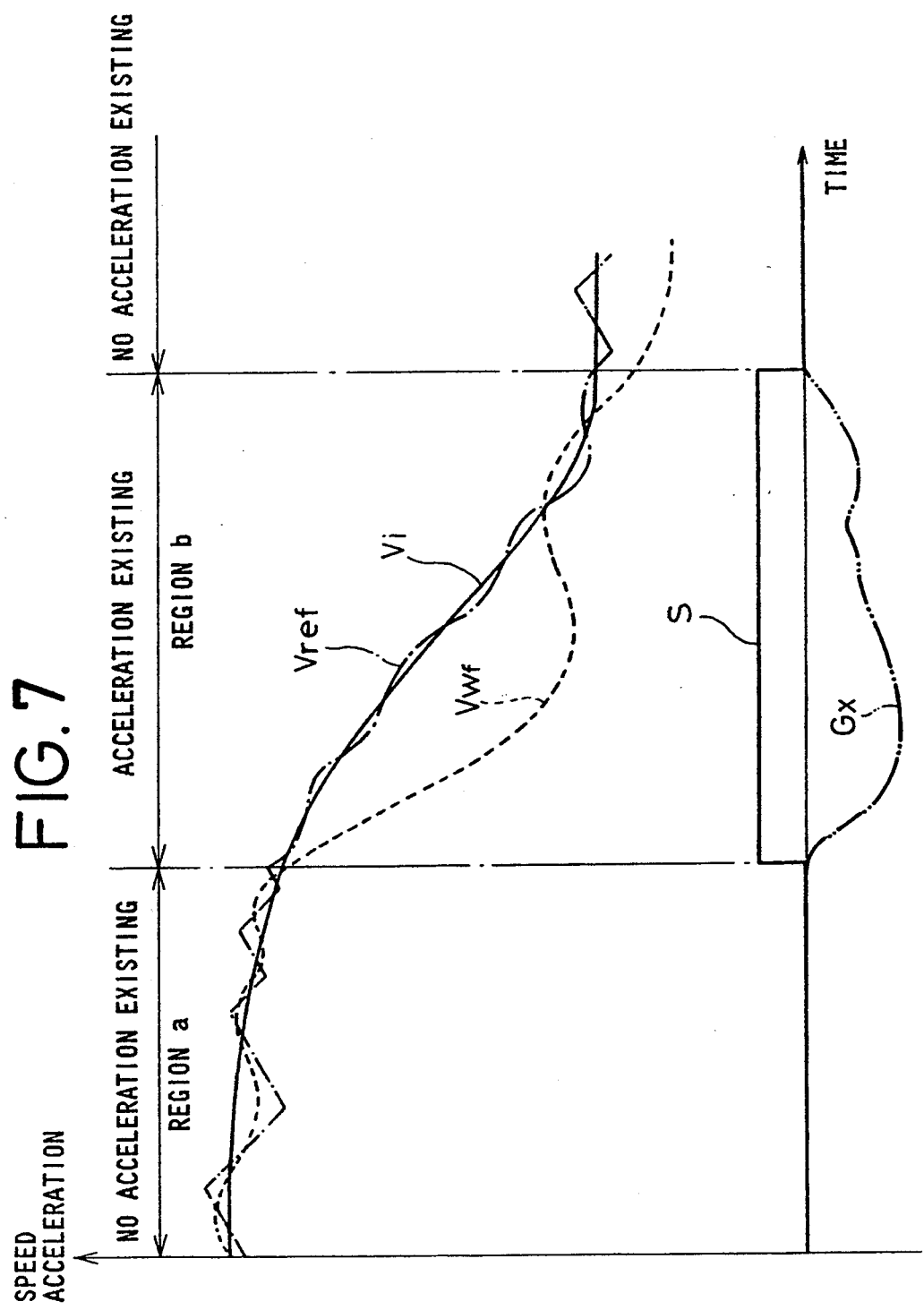
FIG. 7 is a graph for explaining an example in the result of the estimation obtained through the procedures shown in FIG. 6.

FIG. 7 includes an actual running speed $V_i$ (solid line), an estimated running speed $V_{ref}$ (chain line) and a wheel peripheral speed $V_{wf}$ of the front wheel (dashed line). The actual running speed $V_i$, experimentally measured using a laser Doppler-radar or the like, has been shown only for the purpose of comparison with the estimated running speed $V_{ref}$. The graph of FIG. 7 is divided into two regions a and b. In the region a, there is substantially no acceleration existing, but there is in the region b.

Figure 8:
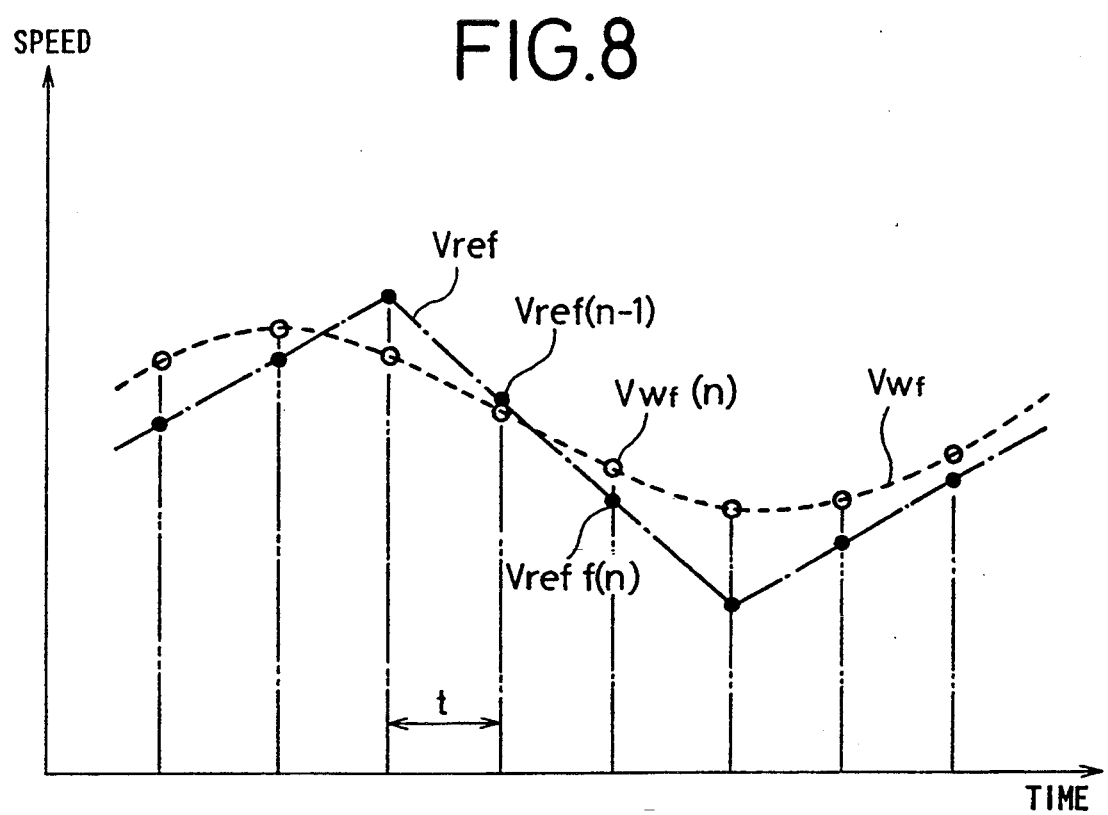
FIG. 8 is a graph for describing a recursive estimation of a running speed of the vehicle in the road surface condition sensor as the second embodiment.

FIG. 8 is a graph for showing the region a of FIG. 7 in an enlarged scale (actual running speed $V_i$ has been omitted), and for describing a recursive estimation of a running speed of the vehicle in the road surface condition sensor as the second embodiment. (n) in the drawing means an n-th estimated value.

As described in FIG. 6, while the vehicle is running, the tachometer 20 mounted to the front wheel 14 first detects the rotational speed thereof as a pulse signal and outputs it to the wheel speed calculating circuit 32. The wheel speed calculating circuit 32 calculates a peripheral speed of the wheel $V_{wf(n)}$ based on the pulse signal per unit time and outputs it to the vehicle speed estimating circuit 36 (Step S1).

On the other hand, the accelerometer 24 mounted to the main body 12 senses an acceleration of the vehicle $G_x$ and outputs it to the acceleration determining circuit 34, and at the same time, to the vehicle speed estimating circuit 36 (Step S2).

Then, the acceleration determining circuit 34 makes a decision as to whether an absolute value of the acceleration $G_x$ is greater than a predetermined value $\alpha$ ($\alpha > 0$) ($|G_x| > \alpha$) (Step S3). If the absolute acceleration $G_x$ is less than the value $\alpha$ ($|G_x| < \alpha$), it is then determined that there is substantially no acceleration working on the vehicle body. If, on the other hand, the absolute acceleration $G_x$ exceeds the value $\alpha$ ($|G_x| < \alpha$), it is then determined that the vehicle body is being accelerated.

In a situation where substantially no acceleration is working, the wheel peripheral speed $V_{wf(n)}$ is normally almost identical to the actual vehicle velocity $V_i$, as indicated by a region a of FIG. 7. It is also considered in this situation that the acceleration $G_x$ obtained from the accelerometer 24 is contaminated with noise caused by such as vibration of the vehicle body. Thus, when an acceleration determining signal which denies existence of acceleration is outputted from the acceleration determining circuit 34, the vehicle speed estimating circuit 36 estimates a running speed $V_{ref(n)}$ using a preset acceleration value, to be described below.

That is, if it is determined in Step S3 that there is no acceleration working, it is then determined whether a present wheel peripheral speed $V_{wf(n)}$ obtained this time is greater than a previously estimated running speed $V_{ref(n-1)}$ which has been obtained in a computation one cycle before (Step S4). If the answer is YES in Step S4, then the previously estimated running speed $V_{ref(n-1)}$ is renewed by the following equation (Step S5):

$$V_{ref(n)} = V_{ref(n-1)} + G_1 \cdot t$$

where, $G_1$ ($> 0$) is a preset acceleration value, and t is a computing cycle time.

If the answer is NO in Step S4, it is then determined whether the present wheel peripheral speed $V_{wf(n)}$ is smaller than the previously estimated running speed $V_{ref(n-1)}$ (Step S6). If the answer is YES in Step S6, then the previously estimated running speed $V_{ref(n-1)}$ is renewed as follows (Step S7):

$$V_{ref(n)} = V_{ref(n-1)} - G_2 \cdot t$$

where, $G_2$ ($> 0$) is a preset deceleration value.

If the answer is NO in Step S6, that is, it is determined that the present wheel peripheral speed $V_{wf(n)}$ is smaller than the previously estimated running speed $V_{ref(n-1)}$, then the previously estimated running speed $V_{ref(n-1)}$ is renewed as follows (Step S8):

$$V_{ref(n)} = V_{ref(n-1)}$$

As has been described in Steps S4 through S9, the present wheel peripheral speed $V_{wf(n)}$ is compared with the previously estimated running speed $V_{ref(n-1)}$, and the previously estimated running speed $V_{ref(n-1)}$ is renewed in various ways depending on the results of the comparison. As a result, a present running speed $V_{ref(n)}$ can be estimated with high accuracy as shown in FIGS. 7 and 8.

On the other hand, when the vehicle is decelerated, for example, the wheels tend to slip on the road surface. Therefore, the difference between the wheel peripheral speed $V_{wf}$ and the actual running speed $V_i$ increases as indicated by a region b of FIG. 7. Thus, if a running speed $V_{ref(n)}$ is estimated based on the wheel peripheral speed $V_{wf(n)}$, as described in Steps S4 through S8, only a poor estimation may be expected.

Thus, when it is judged by the acceleration determining circuit 34 that the absolute acceleration $G_x$ is greater than the value α, the vehicle speed estimating circuit 36 estimates a present running speed $V_{ref(n)}$ in the following manner, provided that the vehicle is being accelerated or decelerated (Step S9):

$$V_{ref(n)} = V_{ref(n-1)} + \int G_x dt$$

Thus, the running speed $V_{ref(n)}$ can be estimated with high accuracy by using an actual acceleration of the vehicle $G_x$.

Now, a brake control system as a third embodiment will be described, which comprises the road surface condition sensor described above as the second embodiment.

Figure 9:
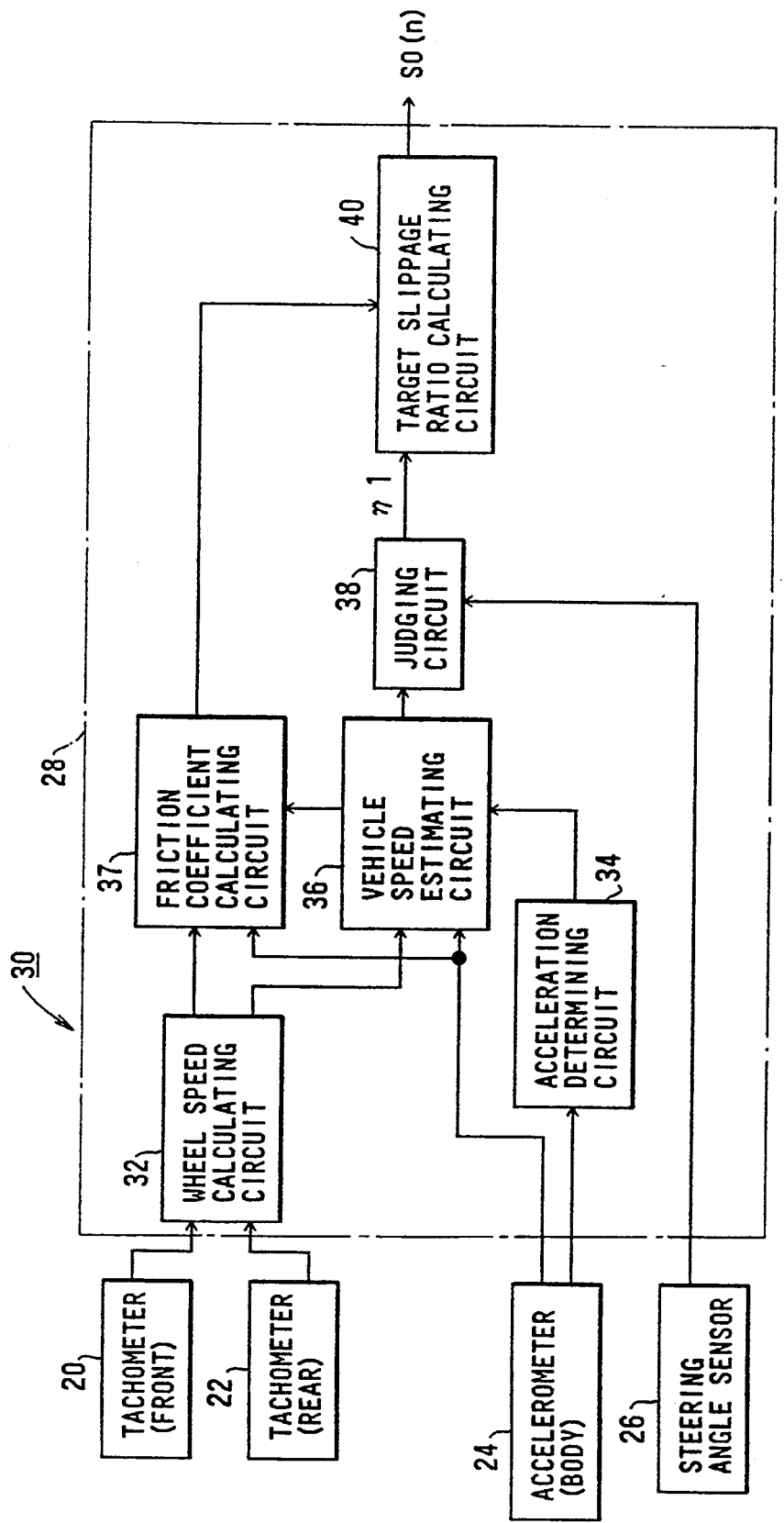
FIG. 9 is a block diagram showing the overall structure of a brake control system as a third embodiment according to the present invention which comprises the road surface condition sensor as the second embodiment.
Figure 10:
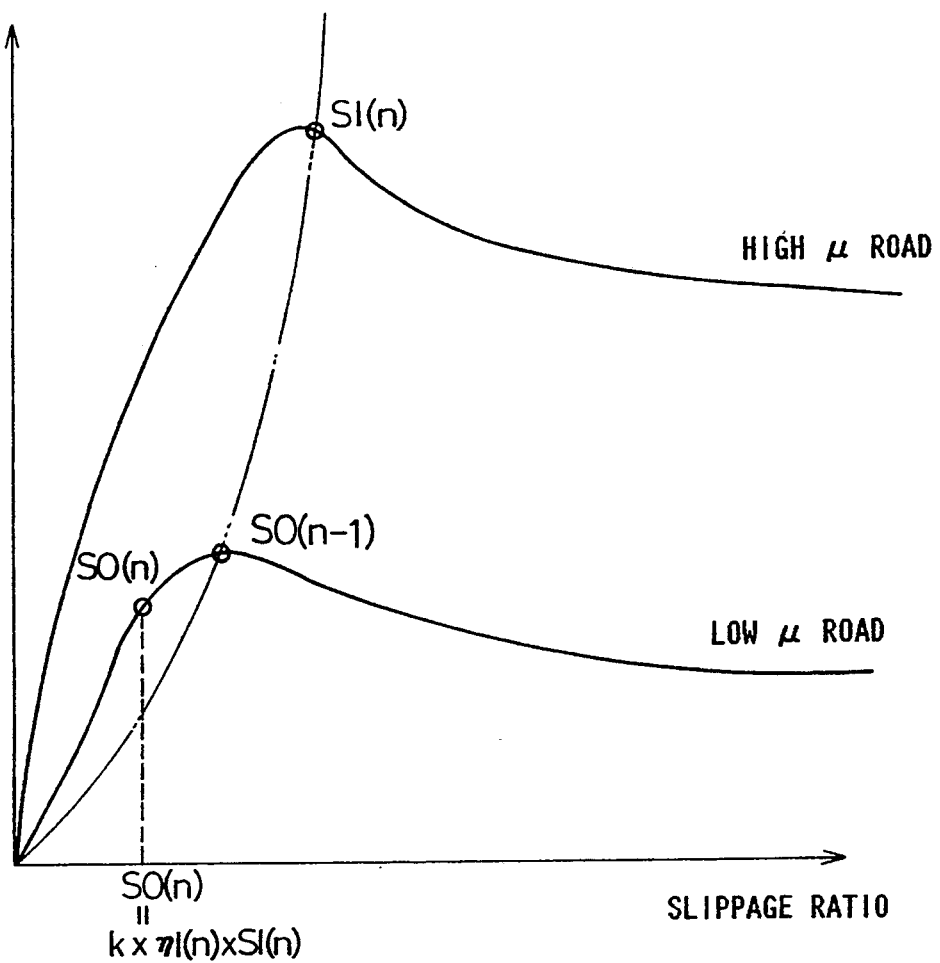
FIG. 10 is a graph for describing the relationship of a slippage ratio vs. braking force in the third embodiment.

FIG. 9 is a block diagram showing the overall structure of a brake control system 30 as a third embodiment. FIG. 10 is a graph for describing the relationship of a slippage ratio vs. braking force in the third embodiment.

In the present embodiment, a friction coefficient estimating circuit 37 and a target slippage ratio setting circuit 40 are further comprised in addition to the construction of the second embodiment.

The friction coefficient estimating circuit 37 estimates the coefficient of friction μ of the road surface against the wheel. The target slippage ratio setting circuit 40 sets an optimum slippage ratio when there is unevenness of the road surface existing.

The friction coefficient estimating circuit 37 first estimates slippage ratios of the front and rear wheels 14 and 16 from the wheel peripheral speeds $V_{wf}$ and $V_{wr}$, and the estimated running speed of the vehicle $V_{ref}$. A slippage ratio of the front wheel 14, for example, is estimated as follows.

$$S_f = (V_{ref} - V_{wf})/V_{ref}$$

A slippage ratio $S_r$ of the rear wheel 16 is also estimated in the same manner as the front wheel 14.

Further, in the friction coefficient estimating circuit 37, the coefficient of friction $\mu_f$ of the road surface against the front wheel 14, for example, is estimated by the following equation using the slippage ratio $S_r$ of the rear wheel 16 and the acceleration of the vehicle $G_x$.

$$\mu_f = (A - B \cdot K_x) \cdot G_x$$

where A and B are constants and $K_x$ represents a coefficient set in advance according to the slippage ratio $S_r$.

That is, when the coefficient of friction $\mu_f$ is estimated, the term $B \cdot K_x \cdot G_x$ related to the coefficient of friction $\mu_r$ on the rear wheel side is subtracted from the term $A \cdot G_x$ as a correction term. Thus, it is possible to accurately estimate the coefficient of friction $\mu_f$ of the road surface against the front wheel 14 without being affected by the friction on the rear wheel side.

Similarly to the front wheel 14, the coefficient of friction $\mu_r$ of the road surface against the rear wheel 16 can be determined based on the slippage ratio $S_f$ of the front wheel 14 and the acceleration of the vehicle $G_x$.

The target slippage ratio setting circuit 40 effects the following calculation using the coefficient of friction $\mu_{(n)}$ of the road surface which has been calculated by the friction coefficient estimating circuit 37.

$$S_{1(n)} = f(\mu_{(n)}) \cdot S_{0(n-1)}$$

where f(μ) represents a function which varies as indicated by the two-dot chain line in FIG. 8, $S_{0(n-1)}$ represents a target slippage ratio obtained by an n-1-th computation and $S_{1(n)}$ represents a temporary target slippage ratio obtained by an n-th computation.

Thus, as shown in FIG. 8, the temporary target slippage ratio $S_{1(n)}$ at which the maximum braking force can be obtained depending on the state of the road surface, can be set up by multiplying the target slippage ratio $S_{0(n-1)}$ by the function f(μ) representative of the relationship between the maximum braking force obtainable when the coefficient of friction $\mu_{(n)}$ of the road surface increases and each wheel is changed from a low μ road to a high μ road and its corresponding slippage ratio.

Next, the target slippage ratio calculating circuit 40 multiplies the temporary target slippage ratio $S_{1(n)}$ by the correction coefficient $\eta_{1(n)}$ as follows:

$$S_{0(n)} = k \cdot \eta_{1(n)} \cdot S_{1(n)}$$

where k is a constant.

Thus, when the vehicle is vibrating due to the unevenness of the road surface, for example, noise is included in a signal outputted from a sensor for calculating a road surface friction coefficient μ. Therefore, when the vehicle is traveling under the low μ road, the vehicle is regarded as traveling on the high μ road. The target slippage ratio (temporary target slippage ratio $S_{1(n)}$ at which the braking force is brought to the maximum on the high μ road as shown in FIG. 8, is set up. When the brake control is made at the set target slippage ratio under the low μ road, a reduction in braking force and an increase in slippage ratio tend to occur. However, the target slippage ratio can be reduced as shown in FIG. 8 and set to the target slippage ratio $S_{0(n)}$ corresponding to the state of the road surface by multiplying the target slippage ratio (temporary target slippage ratio $S_{1(n)}$ by the correction coefficient $\eta_{1(n)}$ (=β) in the target slippage ratio calculating circuit 40. The target slippage ratio $S_{0(n)}$ is outputted to a brake hydraulic pressure control mechanism, which in turn adjusts the brake hydraulic pressure in such a manner that the slippage ratio of each wheel is brought to the target slippage ratio $S_{0(n)}$. As a result, the vehicle can be smoothly driven in spite of various conditions such as the roughness of the road surface, etc.

In the brake control system 30 according to the present embodiment as described above, when the magnitude of the time-derivative of the steering angle $\theta_{h(n)}$ is more than or equal to the predetermined value c in a low-speed range at which the estimated running speed $V_{ref(n)}$ is less than or equal to the predetermined speed $V_a$ or when the magnitude of the time-derivative is greater than or equal to $C \cdot (D - E \cdot V_{ref(n)})/V_{ref(n)}$ in a high-speed range at which the estimated running speed $V_{ref(n)}$ is greater than or equal to the predetermined speed $V_a$ and when this condition is successively met m times or more, it is determined that the steering angle has been varied by the unevenness of the road surface, for example, not by the driver of the vehicle. Further, the road surface condition signal indicative of existence of the unevenness of the road surface is produced. In this case, the target slippage ratio can be reduced by the correction coefficient $\eta_{1(n)}$ if the road surface condition signal is used, thus making it possible to smoothly drive the vehicle irrespective of the unevenness of the road surface.

Having now fully described the invention, it will be apparent to those skilled in the art that many changes and modification can be made without departing from the spirit or scope of the invention as set forth herein.

What is claimed is:

1. A road surface condition sensor, which is incorporated into a vehicle comprising:
   vehicle speed estimating means for estimating a running speed of the vehicle;
   a steering angle sensor for detecting a steering angle of the vehicle; and
   judging means for making a judgement as to whether the magnitude of a time-derivative of the steering angle is equal to or greater than a threshold value which is determined according to the estimated running speed of the vehicle, and for outputting a road surface condition signal indicative of results of the judgement.

2. A sensor according to claim 1, wherein said vehicle speed estimating means comprises a tachometer mounted on at least one wheel of the vehicle, and a vehicle speed estimating circuit for estimating the running speed of the vehicle by assuming a peripheral speed of said at least one wheel calculated from the output of said tachometer is identical to the running speed of the vehicle.

3. A sensor according to claim 2, wherein the wheel having the maximum speed is selected as said at least one wheel.

4. A sensor according to claim 1, wherein said judging means outputs a road surface condition signal indicative of an affirmative judgement only when it is successively judged a predetermined multiple times that said time-derivative of the steering angle is equal to or greater than said threshold value.

5. A sensor according to claim 1, said vehicle speed estimating means comprises a tachometer mounted on at least one wheel of the vehicle, a wheel speed calculating circuit for calculating a peripheral speed of said at least one wheel from the output of said tachometer, an accelerometer mounted on the body of the vehicle, and a vehicle speed estimating circuit for estimating the running speed of the vehicle based on the output signals of said wheel speed calculating circuit and said accelerometer.

6. A sensor according to claim 5, further comprising an acceleration determining circuit which is connected to the output of said accelerometer and whose output is connected to said vehicle speed estimating circuit.

7. A sensor according to claim 6, wherein said acceleration determining circuit makes a decision as to whether the magnitude of acceleration of the vehicle $G_x$ outputted from said accelerometer is greater than or equal to a predetermined value and produces an acceleration affirmation signal if the decision is affirmative, and otherwise, an acceleration denial signal.

8. A sensor according to claim 7, wherein said vehicle speed estimating circuit estimates the running speed of the vehicle in different ways in response to the acceleration affirmation signal and the acceleration denial signal, respectively.

9. A sensor according to claim 8, wherein said vehicle speed estimating circuit renews the running speed of the vehicle $V_{ref(n-1)}$ determined in the preceeding computation cycle with a new running speed of the vehicle $V_{ref(n)}$ by the following equation under the condition that the acceleration denial signal is given and that the presently-calculated wheel peripheral speed $V_{wf(n)}$ is greater than the previous running speed of the vehicle $V_{ref(n-1)}$:

$$V_{ref(n)} = V_{ref(n-1)} + G_1 \cdot t$$

where $G_1$ (>0) represents a preset acceleration value and t represents a computing cycle time.

10. A sensor according to claim 8, wherein said vehicle speed estimating circuit renews the running speed of the vehicle $V_{ref(n-1)}$ determined in the preceeding computation cycle with a new running speed of the vehicle $V_{ref(n)}$ by the following equation under the condition that the acceleration denial signal is given and that the presently-calculated wheel peripheral speed $V_{wf(n)}$ is less than the previous running speed of the vehicle $V_{ref(n-1)}$:

$$V_{ref(n)} = V_{ref(n-1)} - G_2 \cdot t$$

where $G_2$ (>0) represents a preset deceleration value and t represents a computing cycle time.

11. A sensor according to claim 8, wherein said vehicle speed estimating circuit renews the running speed of the vehicle $V_{ref(n-1)}$ determined in the preceeding computation cycle with a new running speed of the vehicle $V_{ref(n)}$ by the following equation when the acceleration affirmation signal is given:

$$V_{ref(n)} = V_{ref(n-1)} + \int G_x dt$$

where t represents a computing cycle time.

* * * * *